(12) United States Patent
Nishida

(10) Patent No.: US 11,354,070 B2
(45) Date of Patent: Jun. 7, 2022

(54) WIRELESS COMMUNICATION SYSTEM, FIRST PROCESSING DEVICE, AND SECOND PROCESSING DEVICE

(71) Applicant: SEIKO EPSON CORPORATION, Tokyo (JP)

(72) Inventor: Kota Nishida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/094,389

(22) Filed: Nov. 10, 2020

(65) Prior Publication Data

US 2021/0141573 A1 May 13, 2021

(30) Foreign Application Priority Data

Nov. 13, 2019 (JP) .............................. JP2019-205325

(51) Int. Cl.
| | |
|---|---|
| G06F 15/00 | (2006.01) |
| G06K 1/00 | (2006.01) |
| G06K 15/00 | (2006.01) |
| G06F 3/12 | (2006.01) |
| H04W 36/08 | (2009.01) |
| H04W 36/30 | (2009.01) |
| H04W 76/15 | (2018.01) |

(52) U.S. Cl.
CPC .......... *G06F 3/1204* (2013.01); *G06F 3/1234* (2013.01); *G06F 3/1236* (2013.01); *H04W 36/08* (2013.01); *H04W 36/30* (2013.01); *H04W 76/15* (2018.02)

(58) Field of Classification Search
CPC .... G06F 3/1204; G06F 3/1234; G06F 3/1236; H04W 76/15; H04W 36/08; H04W 36/30
USPC ............................... 358/1.15, 1.14, 1.13, 1.1
See application file for complete search history.

(56) References Cited

U.S. PATENT DOCUMENTS

| | | | | |
|---|---|---|---|---|
| 2005/0048953 | A1* | 3/2005 | Ohara | ..................... H04L 43/50 455/412.1 |
| 2013/0077568 | A1* | 3/2013 | Mizutani | ............... H04W 48/20 370/328 |
| 2013/0121173 | A1* | 5/2013 | Chen | ..................... H04W 24/08 370/252 |
| 2018/0227954 | A1* | 8/2018 | Singh | .................... H04W 36/08 |
| 2021/0067397 | A1* | 3/2021 | Liston | ..................... G06N 3/08 |

FOREIGN PATENT DOCUMENTS

JP 2012-056117 A 3/2012

* cited by examiner

*Primary Examiner* — Douglas Q Tran
(74) *Attorney, Agent, or Firm* — Workman Nydegger

(57) ABSTRACT

A wireless communication system including: a first processing device configured to function as a first access point; a terminal device configured to be wirelessly connected to the first access point; and a second processing device, wherein the first processing device transmits first connection information used for a connection to the first access point to the second processing device, and the second processing device starts a second access point using second connection information identical to the first connection information received from the first processing device and performs wireless communication with the terminal device using the second access point.

8 Claims, 5 Drawing Sheets

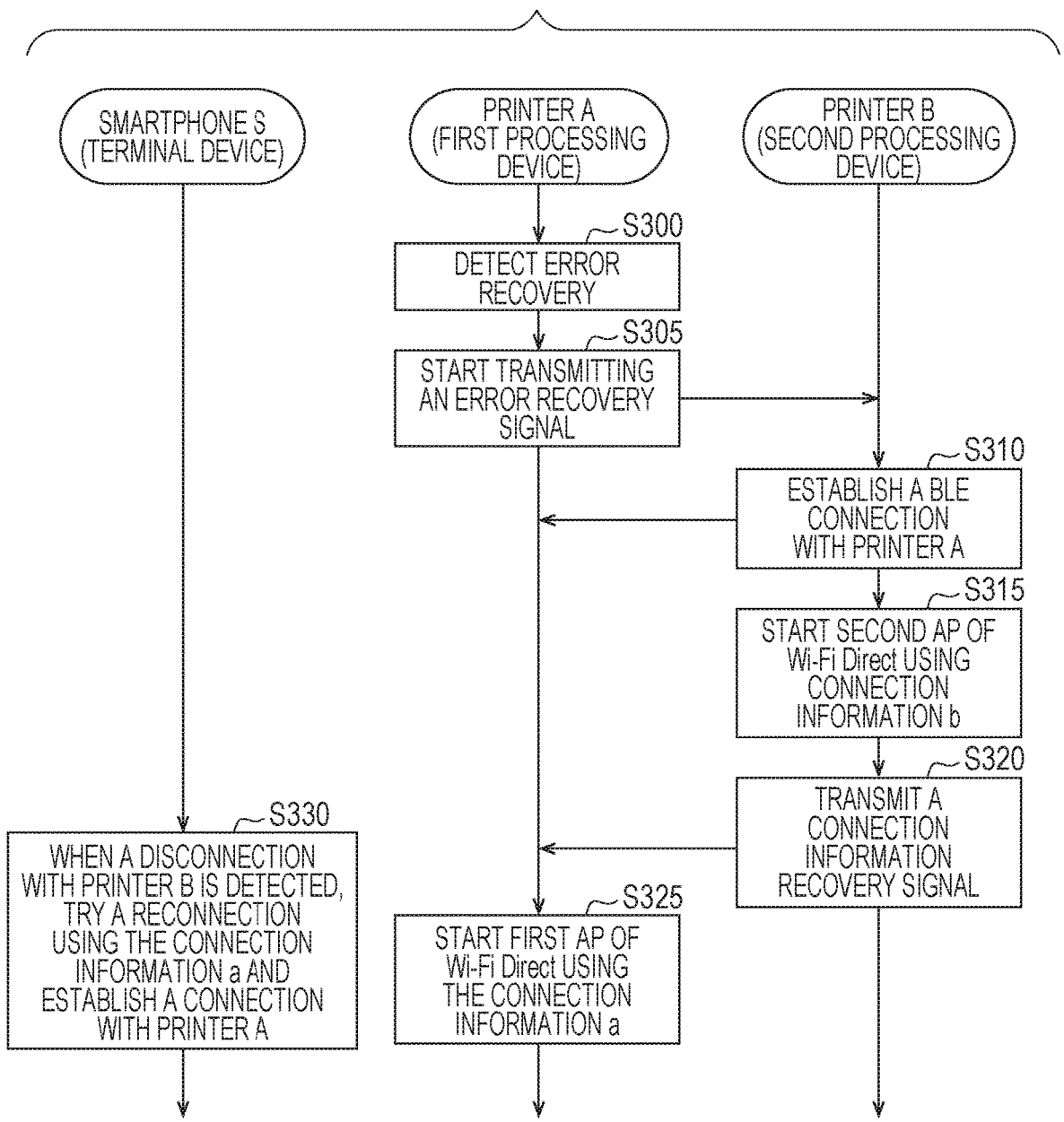

WIRELESS COMMUNICATION SYSTEM, FIRST PROCESSING DEVICE, AND SECOND PROCESSING DEVICE

The present application is based on, and claims priority from JP Application Serial Number 2019-205325, filed Nov. 13, 2019, the disclosure of which is hereby incorporated by reference herein in its entirety.

BACKGROUND

1. Technical Field

The present disclosure relates to a wireless communication system, a first processing device, and a second processing device.

2. Related Art

JP-A-2012-56117 discloses a method of transferring print processing to another printer when a printer becomes unable to print. In this method, when a printer becomes unable to print, the printer searches for another printer located nearby by using short-range wireless communication, obtains destination information from a network of a printer that is located by the search by using the short-range wireless communication, and transfers print processing to the printer identified by the destination information.

To date, a plurality of small printers of the same model are sometimes used in a given store. For example, each salesclerk has a terminal, such as a tablet, or the like and a small printer. When a salesclerk has a business discussion with a customer, it is possible for the salesclerk to transmit a print job to his or her small printer by operating a terminal and cause the printer to print a document, and the like regarding the business discussion while in front of the customer. Also, since a plurality of printers are provided in the store, even if the printer of the salesclerk malfunctions, it is possible to use another printer as a substitute.

However, even if a substitute printer is provided, it is necessary for the user to review settings on a terminal to enable the terminal to transfer a print job to the substitute printer. For example, to establish wireless communication with a substitute printer by using Wi-Fi Direct (Wi-Fi is a registered trademark), or the like, it is necessary for the user to enter the SSID and the password of the substitute printer on the terminal, which is time consuming and burdensome.

SUMMARY

An advantage of some aspects of the present disclosure is that it reduces time and effort of a user when the user uses a substitute processing device and improves usability. According to an aspect of the present disclosure, there is provided a wireless communication system including: a first processing device configured to function as a first access point; a terminal device configured to be wirelessly connected to the first access point; and a second processing device, wherein the first processing device transmits first connection information used for a connection to the first access point to the second processing device, and the second processing device starts a second access point using second connection information identical to the first connection information received from the first processing device and performs wireless communication with the terminal device using the second access point.

With this configuration, it is not necessary for a user to input connection information which is second connection information used for a connection to the second processing device and is different from the first connection information in the terminal device to connect to a substitute second processing device. Accordingly, it is possible to reduce time and effort of a user when the user uses a substitute processing device and improve usability In the wireless communication system described above, the terminal device may have a function of performing wireless communication in conformance with a first communication standard, the first processing device and the second processing device may individually have a function of performing wireless communication in conformance with the first communication standard and a function of performing wireless communication in conformance with a second communication standard, the terminal device may communicate with the first processing device functioning as the first access point in conformance with the first communication standard, the second processing device may transmit a handover ready signal indicating that handover is possible in conformance with the second communication standard in response to a handover operation performed by a user, and when the first processing device receives the handover ready signal, the first processing device may transmit the first connection information to the second processing device in conformance with the second communication standard.

That is to say, when a connection between the second processing device and the first processing device is established in conformance with the second communication standard in response to a handover operation by a user, the first processing device transmits first connection information to the second processing device in order for the second processing device to start the second access point as a substitute of the first processing device, and thus the second access point using the second connection information identical to the first connection information is started. The user ought to perform handover operation to the second processing device, which is the handover destination, and thus it is not necessary for the user to input connection information, which is the second connection information for the second processing device and is different from first connection information to connect to the second access, in the terminal device. Accordingly, it is possible to reduce time and effort of the user.

In the wireless communication system described above, when an error occurs during processing of a job received from the terminal device, the first processing device may transmit an error occurrence signal to the terminal device, when the terminal device receives the error occurrence signal, the terminal device may display a handover icon on a touch panel display included in the terminal device, when the terminal device detects an operation performed on the handover icon by the user, the terminal device may display a message prompting execution of the handover operation to the second processing device, and when the user performs the handover operation to the second processing device, the second processing device may transmit the handover ready signal.

That is to say, when an error occurs in the first processing device, operation for handing over to the substitute second processing device is guided to the terminal device. Accordingly, the user ought to perform the handover operation to the second processing device in accordance with the guidance. In response to the handover operation to the second processing device performed by the user, the handover processing is carried out, and it becomes possible to perform wireless communication between the terminal device and the second processing device.

In the wireless communication system described above, when the first processing device receives a start completion signal of the second access point from the second processing device, the first processing device may turn off the first access point.

That is to say, when the second processing device completes starting the second access point substituting the first processing device, the first processing device may automatically turn off the first access point. Since the first access point is turned off, it is possible to prevent the inconvenience caused by the coexistence of access points using the same connection information. That is to say, it is possible to prevent the terminal device from continuing the connection state with the first processing device and being unable to establish a connection with the second processing device. Also, compared with the configuration in which a user manually turns off the first access point, it is possible to reduce time and effort of the user.

In the wireless communication system described above, when the terminal device detects that the first access point has been turned off, the terminal device may perform reconnection using connection information identical to the first connection information.

By the first processing device automatically turning off the first access point, the connection with the first processing device is disconnected, and thus the terminal device automatically tries a reconnection using the first connection information. These operations are automatically performed, and thus compared with the configuration in which a user manually performs the operations, it is possible to reduce time and effort of the user. After a connection between the terminal device and the second processing device is established, it is possible for the user to cause the substitute second processing device to execute the job, and the like by transmitting a job to the second processing device.

In the wireless communication system described above, after recovering from the error, the first processing device may use connection information different from the first connection information before an occurrence of the error to start the first access point in conformance with the first communication standard.

The "connection information different from that before an occurrence of the error" is connection information different from the connection information transmitted from the first processing device to the second processing device in response to the handover ready signal. Accordingly, it is possible to prevent the inconvenience caused by the coexistence of access points using the same connection information. When the first processing device recovers from an error, it is possible for the user of the terminal device to continue causing the second processing device to execute a job without performing special operation via the terminal device.

In the wireless communication system described above, when the second processing device receives an error recovery signal from the first processing device indicating that the first processing device has recovered from the error, the second processing device may return the second connection information of the started second access point to connection information before handover and restarts the second access point, and when the first processing device receives a connection information recovery signal indicating that the second connection information of the second access point has been returned to connection information before handover from the second processing device, the first processing device may start the first access point using the first connection information identical to that before handover.

That is to say, when the second processing device returns the connection information to that before the handover (different from the first connection information) and restarts the second access point, the connection between the terminal device and the second access point is disconnected. When the terminal device detects a disconnection with the second processing device, the terminal device automatically tries reconnection using connection information identical to the first connection information. The first processing device starts the first access point using the same first connection information as that before the handover, and thus it is possible for the terminal device to establish a connection with the first processing device using the first access point. Accordingly, with this configuration, when the first processing device recovers from an error, it is possible for the user of the terminal device to cause the first processing device to execute a job again via the terminal device without special operation.

In the wireless communication system described above, the second processing device may transmit processing power information of the second processing device to the first processing device, the first processing device may determine whether or not handover to the second processing device is possible based on the processing power information, and when handover is possible, the first processing device may transmit the first connection information of the first processing device to the second processing device, whereas when handover is not possible, the first processing device may transmit a message indicating that handover to the second processing device is not possible to the terminal device.

With this configuration, compared with the case in which when the terminal device has been connected to the second processing device and further has transmitted a job, and then it is determined that the second processing device is unable to execute the job (handover impossible), it is possible for the user to reduce time loss.

According to another aspect of the present disclosure, there is provided a first processing device including: a mechanism to function as a first access point to perform wireless communication with a terminal device, wherein the first processing device transmits first connection information used for a connection to the first access point to a second processing device as a handover destination of an access point function.

With this configuration, since the second processing device is caused to start an access point using the connection information identical to the first connection information used by the first processing device as the first access point as a handover destination, it is possible to provide the second processing device with the first connection information.

According to another aspect of the present disclosure, there is provided a second processing device including: from a first processing device functioning as a first access point to perform wireless communication with a terminal device, upon receiving first connection information used for a connection to the first access point, a mechanism to start a second access point using second connection information identical to the first connection information to perform wireless communication with the terminal device by using the second access point.

With this configuration, it is possible for the second processing device to start the second access point using the second connection information identical to the first connection information that has been used by the first processing device to function as the first access point.

According to another aspect of the present disclosure, there is provided a terminal device including; a mechanism to perform wireless communication with a first processing device functioning as a first access point; when a disconnection to the first access point is detected, a mechanism to try a reconnection using the first connection information used for a connection to the first access point; and a mechanism to connect not to the first processing device, but to a second processing device having started a second access point using second connection information identical to the first connection information by trying the reconnection. Also, according to another aspect of the present disclosure, there is provided a terminal device control program that causes a computer to perform a function of wireless communication with a first processing device functioning as a first access point; when a disconnection to the first access point is detected, a function of trying a reconnection using first connection information used for a connection to the first access point; and a function of connecting not to the first processing device, but to a second processing device having started a second access point using second connection information identical to the first connection information by trying the reconnection.

With this configuration, it is not necessary for a user to input connection information, which is second connection information for connecting to the substitute second processing device and is different from the first connection information, in the terminal device. Accordingly, it is possible to reduce time and effort of the user when the user uses a substitute processing device.

BRIEF DESCRIPTION OF THE DRAWINGS

FIG. 7 is a sequence diagram illustrating a print handover sequence.

DESCRIPTION OF EXEMPLARY EMBODIMENTS

Figure 1:
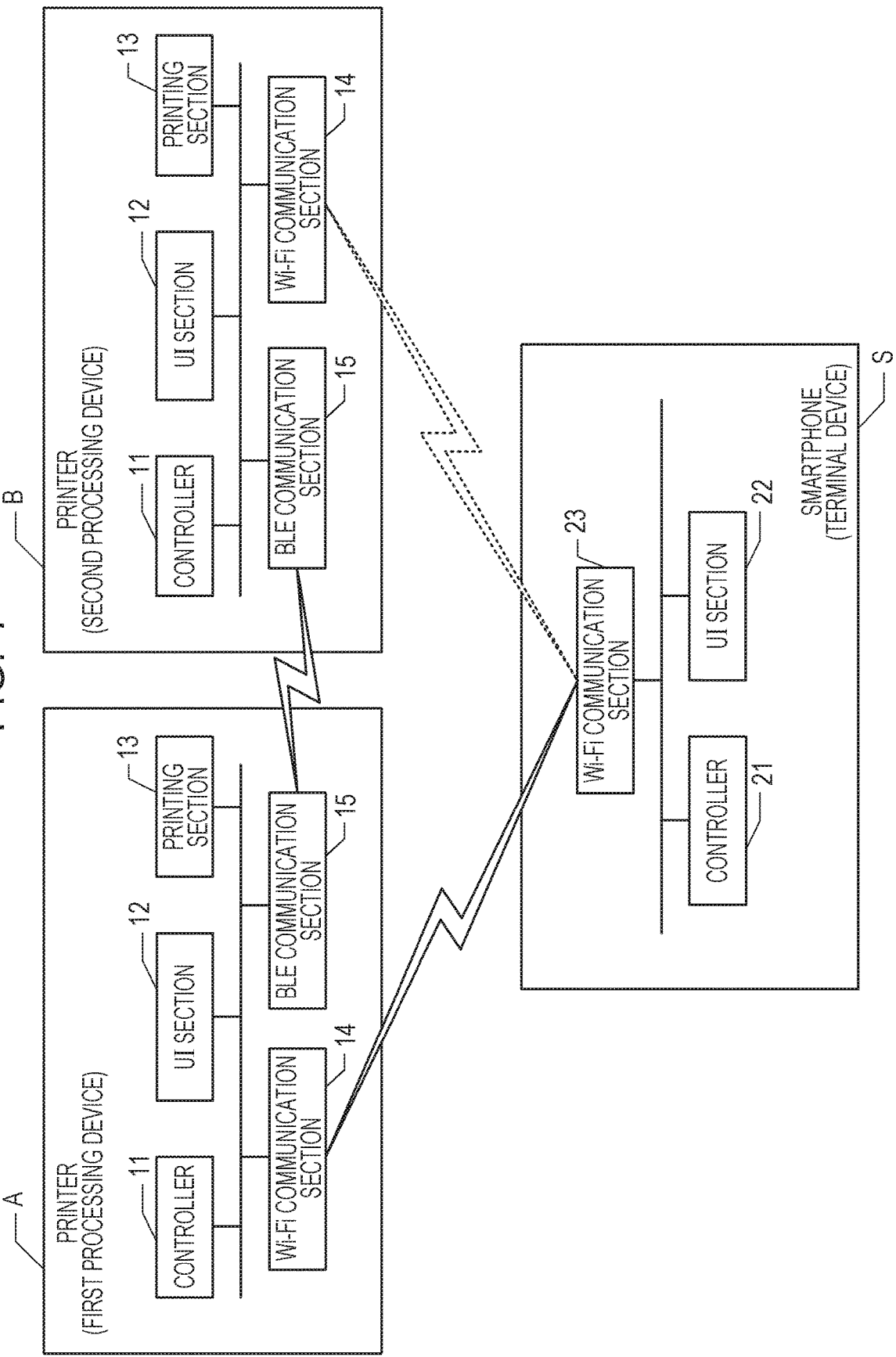
FIG. 1 is a block diagram illustrating the configuration of a wireless communication system.

Here, a description will be given of embodiments of the present disclosure in the following order.
1. Configuration of Wireless Communication System
1.1 Configuration of First Processing Device and Second Processing Device
1.2 Configuration of Terminal Device
2. Print Handover Sequence
3. Other Embodiments 1. Configuration of Wireless Communication System FIG. 1 is a block diagram illustrating the configuration of a wireless communication system according to an embodiment of the present disclosure. The wireless communication system includes a smartphone S as a terminal device, a printer A as a first processing device, and a printer B as a second processing device. In the present embodiment, it is assumed that a plurality of printers including the printers A and B are provided in a specific store, and each salesclerk attending to a customer at the store carries a smartphone. The printers provided in the store are small and portable, and salesclerks attending to customers are in possession of their respective smartphones and printers when having business discussions with a customer. When a salesclerk wants to print a document necessary for a business discussion, and the like, the salesclerk operates his or her smartphone to transmit a print job of the document to a printer through wireless communication and causes the printer to print the document.

1.1 Configuration of First Processing Device and Second Processing Device

The printer A and the printer B individually include a controller 11, a UI section 12, a print section 13, a Wi-Fi communication section 14, and a BLE communication section 15. That is to say, the printer A and the printer B are capable of performing wireless communication in conformance with two different kinds of wireless standards, namely the Wi-Fi (Wi-Fi is a registered trademark) standard and the BLE (Bluetooth (registered trademark) Low Energy) standard. In this regard, in the present embodiment, Wi-Fi Direct corresponds to the first communication standard among the Wi-Fi standards, and the BLE standard corresponds to the second communication standard. Wi-Fi Direct is a scheme in which wireless devices connect directly to each other and perform wireless communication without going through an access point.

The BLE communication section 15 is formed of, for example, a chip or a module that performs wireless communication in conformance with the BLE standard. In the present embodiment, communication through the BLE communication section 15 is performed between the printer A and the printer B.

The Wi-Fi communication section 14 is capable of wirelessly connecting to a communication partner in conformance with the Wi-Fi standard and performing wireless communication. The Wi-Fi communication section 14 is formed of, for example, a chip or a module that performs wireless communication in conformance with the Wi-Fi standard. In the present embodiment, it is possible for the printers A and B to realize an access point function (for example, in the Group Owner mode of Wi-Fi Direct) in response to the controller 11 executing a Wi-Fi communication program described later. Accordingly, the controller 11 and the Wi-Fi communication section 14 enable the printer A (and the printer B) to function as an access point, to directly connect to the smartphone S, and to perform wireless communication. The access point initiated by the printer A is referred to as a first access point, and the access point initiated by the printer B is referred to as a second access point.

The UI (user interface) section 12 includes a touch panel display, various keys, switches, and the like. The touch panel display includes a display panel for displaying various kinds of information under the control of the controller 11 and a touch detection panel attached to the display panel, and detects a touch operation by a human finger, or the like. The controller 11 is capable of obtaining the contents of the operation performed by a user via the UI section 12. Also, the controller 11 is capable of displaying various kinds of information on the display of the UI section 12 to notify the user. The print section 13 includes a transport mechanism (not illustrated) of a print medium and a printing mechanism (not illustrated) for printing an image on the print medium, and the like. Also, the print section 13 includes various sensors and is capable of detecting various errors that have occurred in the print section 13 and notifying the controller 11. The operations of the BLE communication section 15, the Wi-Fi communication section 14, the print section 13, and the UI section 12 are controlled by the controller 11.

The controller 11 includes a CPU, memory, such as ROM, RAM, and the like (not illustrated), and is capable of executing programs recorded in the memory. That is to say, the controller 11 controls the BLE communication section 15, the Wi-Fi communication section 14, the print section 13, and the UI section 12 by executing various programs. For example, the controller 11 displays an image on the touch panel display by executing an image display program and receives user input via the touch panel display, the keys, the switches, and the like by executing an input reception program. Also, the controller 11 performs image processing on an image indicated by a print job by executing a print control program based on the print job and controls the print section 13 to print the image on the print medium.

Further, the controller 11 is capable of controlling the BLE communication section 15 by using the BLE communication program and performing wireless communication with another printer including a BLE communication section in conformance with the BLE standard. Also, the controller 11 is capable of controlling the Wi-Fi communication section 14 by using the Wi-Fi communication program to realize the Wi-Fi Direct access point function and is capable of performing wireless communication with the smartphone S by using Wi-Fi Direct. For the SSID and the password in the case of functioning as an access point, it is possible to use a default value as is or to change the default value to any value. The SSID and the password in the case of functioning as an access point access point are referred to as connection information in this specification. The connection information used for connecting to the first access point is referred to as first connection information, and the connection information used for connecting to the second access point is referred to as second connection information.

It is possible for the controller 11 according to the present embodiment to perform various functions by executing various programs. A program for realizing each function may be a separate program, or a program may include at least one other program. For example, the print control program executed by the controller 11 may include the BLE communication program and the Wi-Fi communication program. In any case, it is possible for the controller 11 to perform various functions by executing the programs.

1.2 Configuration of Terminal Device

The smartphone S as the terminal device includes a controller 21, a UI section 22, and a Wi-Fi communication section 23. The Wi-Fi communication section 23 is capable of performing wireless communication with a communication partner in conformance with the Wi-Fi standard. The Wi-Fi communication section 23 is formed, for example, as a chip or a module that performs wireless communication in conformance with the Wi-Fi standard. In the present embodiment, printing using Wi-Fi Direct among the Wi-Fi standards is assumed, and thus the communication partner with the Wi-Fi communication section 23 is a printer (A, B, or the like). In this regard, when communication is performed with a server (not illustrated), or the like via a LAN, the Internet, or the like, the communication partner of the Wi-Fi communication section 23 may be a wireless LAN router (not illustrated), a Wi-Fi repeater (not illustrated), or the like.

The UI section 22 includes a touch panel display, various switches, and the like. The touch panel display includes a display panel that displays various kinds of information under the control of the controller 21, and a touch detection panel attached to the display panel. The touch panel display detects a touch operation by a human finger, or the like. It is possible for the controller 21 to obtain the contents of the operation performed by the user via the UI section 22. Also, it is possible for the controller 21 to display various kinds of information on the display of the UI section 22 to notify the user. The operation of the Wi-Fi communication section 23 and the UI section 22 is controlled by the controller 21.

The controller 21 includes a CPU, memory, such as a ROM, a RAM (unillustrated), and the like, and is capable of executing a program recorded in the memory. That is to say, the controller 21 controls the Wi-Fi communication section 23 and the UI section 22 by executing various programs. For example, the controller 21 controls the Wi-Fi communication section 23 by using the Wi-Fi communication program and is capable of performing wireless communication with the printers A and B in conformance with the Wi-Fi standard.

A salesclerk attending to a customer has a business discussion while carrying a smartphone and a printer. It is possible to establish a connection between a smartphone S and a printer A possessed by the salesclerk by using Wi-Fi Direct, for example, through the following operation procedure. For example, when a user selects a Wi-Fi Direct connection via the touch panel display of the printer A, the connection information a (first connection information) of the printer A is displayed on the touch panel display of the printer A, and the printer A is started as a first access point. The connection information a includes the SSID and the password of the printer A. After the printer A initiates the first access point, the printer A transmits a beacon including the SSID. The smartphone S receives the beacon and displays the SSID of the printer A on the touch panel display as one candidate of the Wi-Fi connection destinations. In this regard, instead of the SSID, the identification information (model name, or the like) of the printer A may be displayed or both the SSID and the identification information may be displayed.

When the user selects the SSID of the printer A from candidates in the smartphone S, the smartphone S prompts the user to enter a password for the wireless device (that is to say, the printer A) corresponding to the SSID. The user refers to the connection information a (first connection information) displayed on the touch panel display of the printer A and enters a password on the touch panel display of the smartphone S to instruct a connection to be made with the wireless device corresponding to the SSID. By such an operation performed by the user, it is possible to establish a connection between the smartphone S and the printer A by using Wi-Fi Direct. In this regard, this operation procedure is an example, and other various procedures may be assumed. Also, when a connection between the smartphone S and the printer A has been established, the connection information a of the printer A may be saved in the memory of the smartphone S, and a connection may be automatically established thereafter without the user having to enter a password or provide a connection instruction.

In this manner, in the state in which the printer A is specified as the Wi-Fi connection destination, it is possible for the controller 21 to cause the printer A to execute printing by using a printing program. Specifically, the controller 21 displays candidates of the images to be printed on the touch panel display of the UI section 22 and identifies an image to be printed in accordance with input on the touch panel display by the user. In the present embodiment, using wireless communication in conformance with the Wi-Fi standard, it is possible for the controller 21 to transmit a print job including print data representing a print target to the printer A to which a connection has been established by the smartphone S. When a print job is received, the controller 11 of the printer A controls the print section 13 in accordance with the print job and prints the image of the print target on the print medium.

In this regard, the image of the print target may be obtained by any method, may be an image recorded in the memory, may be an image obtained from an external memory or computer via an unillustrated interface, and may be an image obtained from an external computer via a network.

The various functions of the controller 21 according to the present embodiment may be realized by various programs. The program for realizing each function may be a separate program, or a program may include at least one other program. For example, the print program executed by the controller 21 may include the Wi-Fi communication program.

2. Print Handover Sequence

Figure 2:
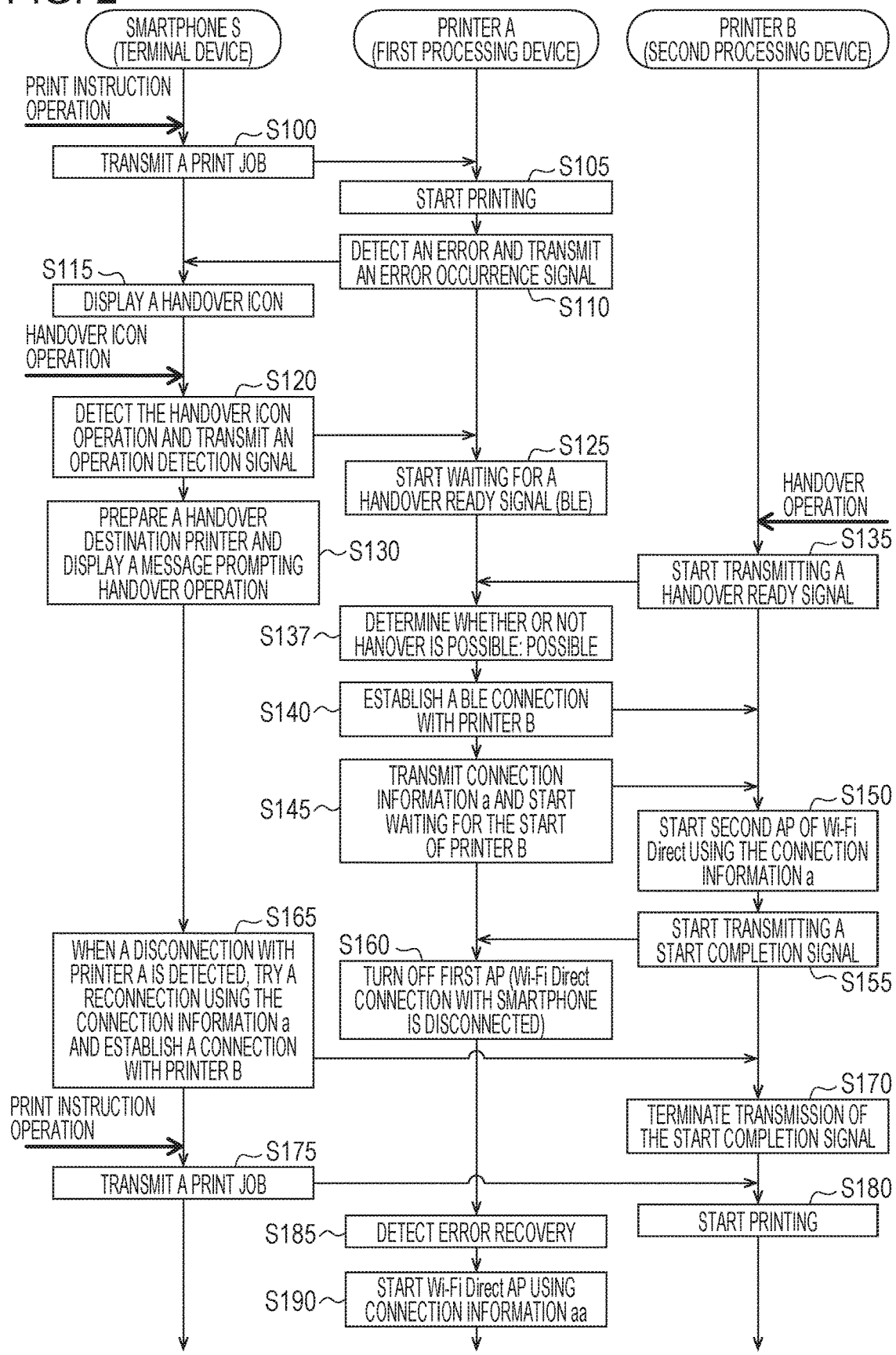
FIG. 2 is a sequence diagram illustrating a print handover sequence.

Next, a description will be given of the sequence of when a connection with the smartphone S is handed over from the printer A (the first access point of the printer A) to the printer B (the second access point of the printer B) in a state in which a Wi-Fi Direct connection is established between the smartphone S and the printer A with reference to a print handover sequence in FIG. 2. In this regard, in the sequence diagram illustrated in FIG. 2, the transfer sequence of detailed data between the wireless communication devices is omitted, and the schematic sequence is illustrated. The printer A is in the state of functioning as the first access point using the connection information a (first connection information). The smartphone S is in the state in which the printer A is specified as a printer to which a print job is to be transmitted.

Figure 3:
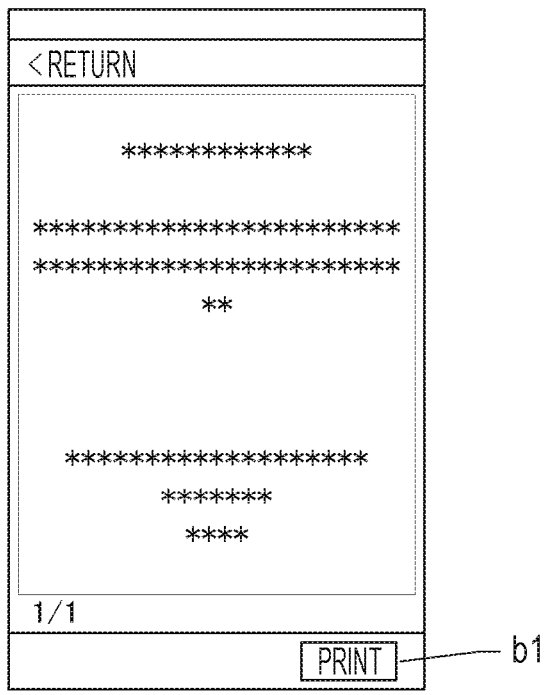
FIG. 3 is a diagram illustrating a display example.

When the user gives a print instruction operation on the smartphone S, the smartphone S transmits a print job to the printer A (step S100). That is to say, the controller 21 of the smartphone S executes the print program so as to display a selection screen of print candidate data on the touch panel display and prompts the user to select data to be printed. FIG. 3 is a screen displayed on the touch panel display of the UI section 22 and is an example of the preview screen of the selected print target data. The preview screen includes a printing button b1. When controller 21 detects that the printing button b1 has been touched, the controller 21 considers that a print instruction operation has been performed. The controller 21 transmits a print job including the selected data to be printed, the printing condition (the number of prints, printing range, paper size, paper type, layout, print quality, color/monochrome, single-sided/double-sided printing, and the like), and the like to the printer A in conformance with the Wi-Fi standard.

When receiving the print job, the printer A starts printing (step S105). That is to say, the controller 11 of the printer A controls the print section 13 based on the print job and causes the print section 13 to perform printing on the print medium. When the printer A detects that an error has occurred during print execution and it has become impossible to continue printing, the printer A transmits an error occurrence signal to the smartphone S (step S110). That is to say, when the controller 11 of the printer A receives a notification of the occurrence of an error from the sensor of the print section 13, the controller 11 transmits by controlling the Wi-Fi communication section 14 in conformance with the Wi-Fi standard an error occurrence signal indicating that an error has occurred in the printer A to the smartphone S.

Figure 4:
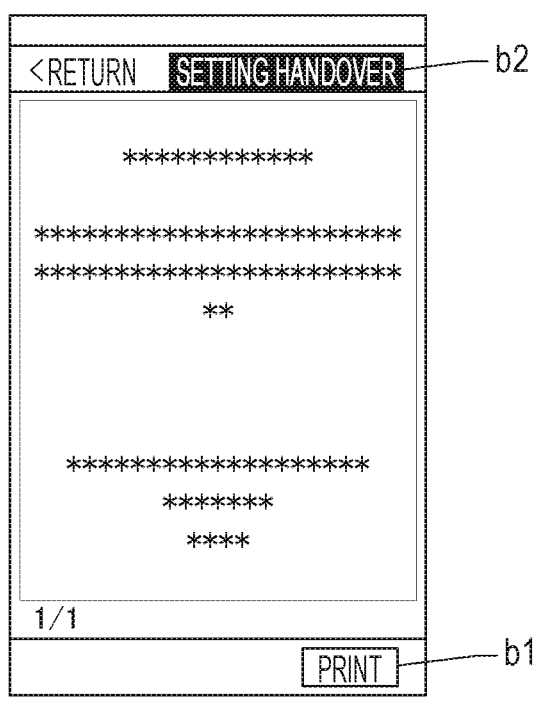
FIG. 4 is a diagram illustrating a display example.

When the smartphone S receives the error occurrence signal from the printer A, the smartphone S displays a handover icon (step S115). That is to say, when the controller 21 of the smartphone S receives the error occurrence signal from the printer A via the Wi-Fi communication section 23, the controller 21 displays the handover icon on the touch panel display of the UI section 22. FIG. 4 illustrates a display example of a handover icon b2.

When the user touches the handover icon, the smartphone S detects a user operation performed on the handover icon and transmits an operation detection signal to the printer A (step S120). That is to say, when the controller 21 detects that the handover icon b2 has been touched, the controller 21 considers that an operation has been performed on the handover icon and transmits an operation detection signal to the printer A in conformance with the Wi-Fi standard.

When the printer A receives the operation detection signal, the printer A starts waiting for a handover ready signal (step S125). The handover ready signal is, as described later, a BLE beacon to be transmitted from the printer B by broadcast in response to a handover operation of the printer B, which is a substitute machine (handover destination) for the printer A, and, for example, includes information indicating that handover is ready. When the controller 11 of the printer A receives an operation detection signal, the controller 11 enters a waiting state for receiving a handover ready signal from the printer B.

Figure 5:
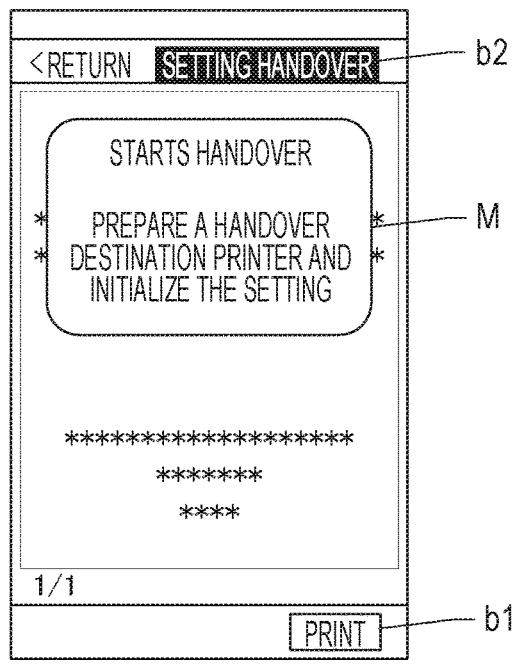
FIG. 5 is a diagram illustrating a display example.

After executing step S120, the smartphone S displays a message prompting the user to prepare a handover destination printer and to execute the handover operation (step S130). That is to say, the controller 21 of the smartphone S displays the message on the touch panel display of the UI section 22. FIG. 5 illustrates a display example of the message M. In this regard, a more detailed operation procedure on the handover operation may be included in the message. When the printer is provided in advance with a hardware key for the handover operation, when operation on that key is detected, it may be considered that the handover operation has been performed. Alternatively, by following the hierarchy of the settings menu displayed on the touch panel display, a handover operation button, or the like may be displayed. When a touch on the handover operation button is detected, the handover operation may be considered to have been performed.

The user selects one of the printers that are provided in the store and are not in use by the other salesclerks (printer B) in accordance with the message displayed in step S130 and places the printer in the vicinity of the printer A. When the user performs a handover operation on the printer B in accordance with the message, the printer B detects the handover operation and starts transmitting a handover ready signal (step S135). That is to say, the controller 11 of the printer B broadcasts a BLE beacon. In this manner, when an error occurs in the printer A, the operation for handing over printing to the substitute printer B is guided by the smartphone S, and thus it is possible for the user to easily perform the handover operation in accordance with the guidance.

In the present embodiment, a handover ready signal includes processing power information of the printer B. The processing power information is the information indicating the processing power (specification) of the printer B (the information may directly or indirectly indicate the processing power). For example, the handover ready signal may include the model information of the printer B as processing power information. It is possible for the controller 11 of the printer A to identify the processing power information of the printer B in accordance with the model information of the printer B. When the controller 11 of the printer A receives the handover ready signal, the controller 11 determines whether or not handover is possible based on the print job and the processing power information of the printer B (step S137). For example, when the printer B has sufficient processing power to perform printing in accordance with the printing condition indicated by the print job, the controller 11 of the printer A determines that the handover to the printer B is possible.

When it is determined that the handover to the printer B is possible in step S137, the printer A establishes a BLE connection with the printer B (step S140). That is to say, the printer A and the printer B perform the predetermined sequence for establishing a connection in conformance with the BLE standard so as to establish a BLE connection between the printer A and the printer B.

When a BLE connection between the printer A and the printer B is established, the printer A transmits connection information a (first connection information) to the printer B and starts waiting for the start of the second access point of the printer B (step S145). That is to say, the controller 11 of the printer A controls the BLE communication section 15 to transmit the connection information a (first connection information) of the first access point to the printer B in conformance with the BLE standard.

When receiving the connection information a (first connection information) from the printer A, the printer B starts the second access point of Wi-Fi Direct by using the connection information a as the second connection information (step S150). That is to say, the controller 11 of the printer B controls the Wi-Fi communication section 14 to newly start the second access point using the same SSID and password as those of the printer A that has already been functioning as the first access point of Wi-Fi Direct with the smartphone S. After the start, the second access point periodically transmits a beacon including the SSID of the connection information a. In the memory of the printer B, default connection information b to be used when the printer B functions as a second access point is recorded. However, the access point is started, in step S150, not using the connection information b, but using the connection information a received from the printer A. When the access point is started using the connection information a, the connection information b does not have to be discarded from the memory. In this regard, in the present embodiment, with the start of the second access point in step S150, the BLE connection established in S140 between the printers A and B is disconnected once.

When the printer B starts the second access point, the printer B transmits a start completion signal to the printer A (step S155). In the present embodiment, the start completion signal is a BLE beacon and includes, for example, information indicating completion of the start. The controller 11 of the printer B controls the BLE communication section 15 to broadcast the BLE beacon in conformance with the BLE standard.

When receiving the start completion signal, the printer A turns off the first access point of the printer A (step S160). That is to say, the controller 11 of the printer A controls the Wi-Fi communication section 14 to disable the function of the first access point of the printer A. In this manner, when the printer B completes starting as a substitute access point for the printer A, the printer A automatically turns off its own access point. Accordingly, compared with the case in which the user performs a manual turn-off operation, it is possible to reduce the user's time and effort. The controller 11 of the printer A controls the Wi-Fi communication section 14 of the printer A to disable the first access point function so as to disconnect the Wi-Fi Direct connection with the smartphone S.

When the smartphone S detects disconnection of the Wi-Fi Direct connection with the printer A (first access point), the smartphone S attempts to reconnect to the access point by using the connection information a and accordingly establishes a Wi-Fi Direct connection with the printer B (second access point) (step S165). That is to say, when the controller 21 of the smartphone S detects that a connection with the printer A has been disconnected, the controller 21 attempts to reconnect using the connection information a that has been used for the connection with the printer A. The smartphone S scans for a beacon including the SSID indicated by the connection information a, and when the smartphone S detects the beacon (which is transmitted from the second access point) including the SSID, a connection is established using the password indicated by the connection information a. These operations are performed automatically, and thus compared with the case in which the user manually establishes a connection, it is possible to reduce the user's time and effort.

When the printer B establishes a Wi-Fi Direct connection with the smartphone S, the printer B terminates transmission of the start completion signal that has been periodically broadcast from step S155 (step S170). In this regard, when a connection with the printer B is established in step S165, the controller 21 of the smartphone S cancels the message M (FIG. 5) displayed in S130 on the touch panel display, and a preview screen illustrated in FIG. 3 is displayed again (while the connection destination printer has been automatically changed to the printer B).

When the user touches the printing button b1 to give a printing instruction operation on the smartphone S again, the controller 21 of the smartphone S transmits a print job to the printer B (step S175). That is to say, when the controller 21 detects that the printing button b1 has been touched, the controller 21 considers that the printing instruction operation has been given. The controller 21 transmits the print job including the selected print target data, the printing condition, and the like to the printer B in conformance with the Wi-Fi standard. When the printer B receives the print job from the smartphone S, the printer B starts printing based on the print job (step S180). That is to say, the controller 11 of the printer A controls the print section 13 in accordance with the print job to perform printing.

As described above, with the present embodiment, when the user wants to perform printing on the printer B instead of the printer A with which an error has occurred, it is not necessary for the user to input the connection information for the printer B into the smartphone S to connect to the printer B. When the user performs a handover operation on the printer B, the smartphone S automatically establishes a Wi-Fi Direct connection with the printer B in place of the printer A. Accordingly, when using the printer B as a substitute machine instead of the printer A, it is possible to reduce the user's time and effort and to improve usability.

In this regard, after the printer A disables the access point function in step S160, when the printer A is recovered from the error by maintenance, or the like, it is possible to use the printer A again. Thus, after recovery from an error, the printer A starts the first access point using connection information different from that of before the occurrence of the error as the first connection information in conformance with the Wi-Fi standard (step S185). That is to say, the controller 11 of the printer A starts the first access point of Wi-Fi Direct using connection information aa which is different from the connection information a, which is the connection information before the occurrence of the error, as the first connection information. In this manner, when the printer A has recovered from the error, it is possible for the user of the smartphone S to continue using the printer B via the smartphone S without performing special operation. When another user establishes a connection between a smartphone and the printer A using Wi-Fi Direct, it is possible for that user to use the printer A.

Figure 6:
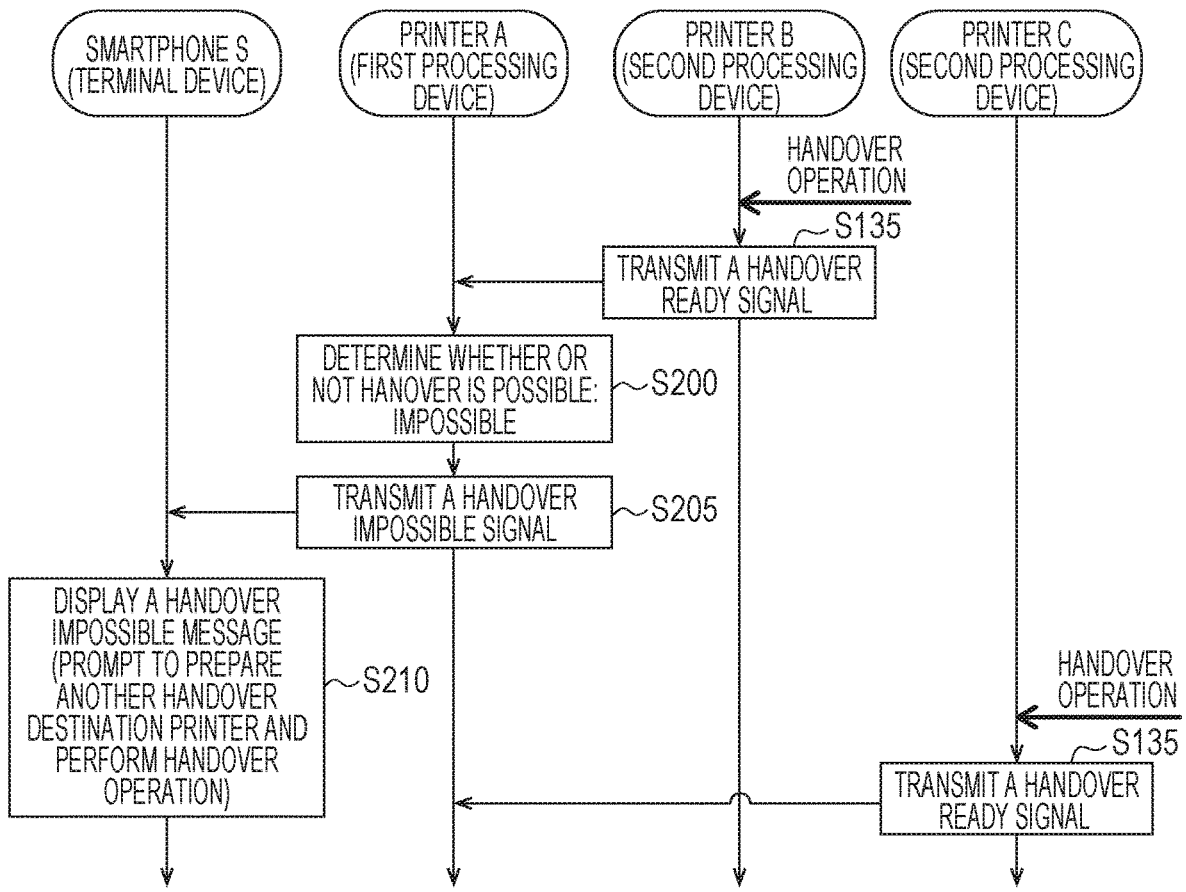
FIG. 6 is a sequence diagram illustrating a print handover sequence.

In this regard, a description will be given of the sequence of when the handover determination based on the handover ready signal transmitted from the printer B in step S135 is impossible with reference to FIG. 6. By the handover operation having been performed on the printer B, the printer B transmits a handover ready signal to the printer A in conformance with the BLE standard (step S135). When the printer A determines that the handover to the printer B is impossible based on the processing power information included in the handover ready signal (step S200), the printer A transmits a handover impossible signal indicating that the handover to the printer B is not possible to the smartphone S in conformance with the Wi-Fi standard (step S205). When the smartphone S receives the handover impossible signal, the smartphone S displays a message indicating that the handover to the printer B is impossible on the touch panel display on the UI section 22 (step S210). The message may include a message prompting that it is impossible to hand over to the printer B, to further prepare another handover destination printer, and to perform handover operation on the printer (printer C). When the user performs handover operation on the printer C in accordance with the message, the sequence of step S135 and thereafter, illustrated in FIG. 2 and FIG. 6, is performed between the printer A and the printer C this time. In this manner, compared with the case in which after the smartphone S connects to the printer B and transmits a print job, a determination is made that the printer B is unable to perform the print job due to insufficient processing power of the printer B, it is possible to reduce time loss of the user. In this regard, although it is advantageous for reducing time loss when handover is impossible, the determination in step S137 or step S200 may not be performed, and thus may be omitted.

3. Other Embodiments

The embodiment described above is an example for carrying out the present disclosure, and it is possible to use various other embodiments. For example, the first processing device and the second processing device may be any device as long as the device is capable of transferring data with the terminal device by using wireless communication, and thus the device may be assumed to be a device capable of performing various kinds of processing. For example, the first processing device and the second processing device may be a printer, a scanner, or a complex machine having a print function and a scan function. The terminal device may be any device as long as it includes a wireless communication function, and thus the terminal device may be assumed to be a smartphone, a tablet, a notebook PC, a smart watch, smart glasses, and the like.

The first processing device that functions as the first access point and performs wireless communication with the terminal device may be any device as long as the device is capable of transmitting the first connection information used for a connection to the first access point to the second processing device. The first processing device may directly transmit, or may indirectly transmit the first connection information to the second processing device. In the latter case, for example, the first processing device may transmit the connection information to the second processing device via the terminal device. More specifically, for example, the printer A may transmit the first connection information to the terminal device by Wi-Fi Direct, and the terminal device may transmit the first connection information to the printer B in conformance with the BLE standard.

Any access point may be used as long as it is a base station for wireless communication. The first processing device functions as a first access point so that the terminal device ought to be able to perform wireless communication with the first processing device. Also, the second processing device functions as the second access point so that the terminal device ought to be able to perform wireless communication with the second processing device.

The connection information is the information that becomes necessary for connecting to an access point. For example, the connection information may include the identification information of the first access point, and authentication information (password, encryption key, security key, and the like) for improving the security of communication, and the like. Of course, when the other information is necessary for a connection, that information may be included in the connection information.

A communication standard is a communication rule and method to be followed when devices perform communication with each other. In a communication standard, the procedure for establishing communication between the devices, and the like are specified. The devices that perform communication with each other have the same communication standard in common for using the communication. The devices perform communication in conformance with the communication standard so as to perform communication between the devices.

The handover operation ought to be an operation for triggering transmission to the first processing device of a handover ready signal which indicates that the second processing device has become handover possible, that is to say, the second processing device has become ready for obtaining the first connection information from the first processing device. When the handover ready signal is transmitted from the second processing device to the first processing device, the first processing device transmits the first connection information to the second processing device, and the second processing device ought to start the second access point using the second connection information identical to the first connection information.

The error occurrence signal ought to be a signal that notifies the terminal device of an occurrence of an error while the first processing device performs processing of a job received from the terminal device. The terminal device that has received the error occurrence signal ought to notify the user of the occurrence of an error in the first processing device, and to prompt the user to take action for handing over from the first processing device to the second processing device. In this regard, an error that causes an error occurrence signal is not limited to an error that occurs while a job received from the terminal device is being processed. Regardless of whether or not the job is being processed, the state in which the first processing device is unable to process a newly received job from the terminal device from now on may be considered as the occurrence of an error, and an error occurrence signal may be transmitted to the terminal device.

The handover icon ought to be able to notify the user of the occurrence of an error in the first processing device. Also, the handover icon ought to be able to receive an instruction, by the user, of performing handover from the first processing device to the second processing device and to prompt the user to perform handover operation on the second processing device. In this regard, in the embodiment described above, an operation detection signal is transmitted to the first processing device in response to the operation on the handover icon, and the first processing device becomes waiting for a handover ready signal from the second processing device. However, another procedure may be employed. For example, the operation detection signal is not transmitted in response to the handover icon operation, and a message ought to be notified the user, in response to the handover icon operation, that prompts the user to perform operation to cause the first processing device to wait for the handover ready signal and to perform handover operation on the second processing device. By receiving this message, the user ought to perform these operations on the first processing device and the second processing device so as to transmit the first connection information from the first processing device to the second processing device.

Returning from the error indicates that the error that has occurred in the first processing device is eliminated (recovery from the error), and that a job requested from the terminal device has become executable.

The first processing device may communicate with the second processing device in conformance with the BLE standard or the wireless standard of Bluetooth (registered trademark) 3.0 or earlier. Also, the communication between the first processing device and the second processing device may be performed via a wireless LAN or by NFC communication. In this regard, the communication between the first processing device and the second processing device may be wired communication.

Further, the embodiment described above has the configuration in which the processing power information of the printer B is included in the BLE beacon. However, the configuration is not limited to this. For example, after a BLE connection between the printer A and the printer B is established in S140 in FIG. 2, the processing power information of the printer B may be transmitted to the printer A. The processing power information may include the state information on the printer B (for example, information on the remaining amount of ink, information on the remaining amount of paper, information on the size and the direction of paper set in the paper cassette, and the like) in addition to the model information of the printer B.

In this regard, the determination as to whether or not handover is possible may be performed on the printer B, and a determination result may be notified to the printer A. For example, after a BLE connection with the printer B is established in S140, the printer A may transmit the printing condition, and the like of the print job in S100 to the printer B. The printer B determines whether or not handover is possible based on the printing condition, the model information of the printer B, and the state information, and a determination result is transmitted to the printer A. When the determination result is that handover is possible, the printer A transmits the connection information a to the printer B and waits for the start of the printer B. Whereas when the determination result is that handover is not possible, as illustrated in S205 in FIG. 6, a handover impossible message is transmitted to the smartphone S. The configuration described above may be employed.

After the first processing device has recovered from an error, a sequence illustrated in FIG. 7 may be performed. The sequence illustrated in FIG. 7 is performed after the processing of step S180 in FIG. 2 is terminated (in the state in which processing of S185 to S190 has not been performed). Accordingly, the printer B is functioning as a second access point using the connection information a of the printer A as the second connection information, the printer A has disabled the access point function, and a connection is established between the smartphone S and the printer B by Wi-Fi Direct. When the printer A detects that the error in the printer A has been recovered (step S300), the printer A transmits an error recovery signal to the printer B (step S305). The error recovery signal ought to be a signal that notifies the second processing device that the first processing device has become the state in which the error occurred in the first processing device is eliminated, and the job requested from the terminal device has become executable. For example, the error recovery signal may be included in the beacon broadcast in conformance with the BLE standard. When the printer B detects the error recovery signal, the printer B establishes a BLE connection with the printer A (step S310) and starts the second access point for Wi-Fi Direct using the connection information before the handover as the second connection information (step S315). That is to say, the printer B disables the second access point that has been running so far by using the connection information a, and enables the second access point by using the connection information b before the handover as the second connection information. The connection information b is the connection information used by the printer B before starting the second access point using the connection information a (that is to say, before the handover).

When the printer B initiates the access point using the connection information b, the printer B transmits a connection information recovery signal to the printer A in conformance with the BLE standard (step S320). The connection information recovery signal is a signal that indicates that the second connection information of the second access point is returned to the connection information before the handover. When the printer A receives the connection information recovery signal, the printer A restarts the first access point, which has been disabled so far, by using the connection information a as the first connection information without change (step S325). After the restart, the first access point periodically transmits a beacon including the SSID of the connection information a. The smartphone S has been connected to the printer B that has enabled the second access point using the connection information a so far. However, since the second access point has been disabled in step S315, it is possible for the smartphone S to detect that the Wi-Fi Direct connection with the printer B has been disconnected. When the smartphone S detects that a connection with the printer B has been disconnected, the smartphone S attempts to reconnect to an access point using the connection information a. As a result, the smartphone S establishes a Wi-Fi Direct connection with the printer A that has started the first access point in S325 (step S330). Accordingly, in the present configuration, when the printer A recovers from an error, it is possible for the user of the smartphone S to cause the printer A to perform printing again via the smartphone S without performing any special operation.

Further, it is possible to apply the present disclosure as a program and a method executed by a computer. Also, it may be possible to realize the above-described system, program, and method as a single device, or as a plurality of devices using parts included in the devices, and various modes. Also, it is possible to suitably change the present embodiments to include a part of them as software and a part of them as hardware, and the like. Further, the present disclosure may be made as a recording medium including a program that controls a system. Of course, it is thought that the recording medium of the program may be a magnetic recording medium, a semiconductor memory, or any recording medium to be developed in the future exactly in the same manner.

What is claimed is:

1. A wireless communication system comprising:
a first processing device configured to include a first access point;
a terminal device configured to be wirelessly connected to the first access point; and
a second processing device, wherein
the first processing device transmits first connection information used for a connection to the first access point to the second processing device,
the second processing device starts a second access point using second connection information identical to the first connection information received from the first processing device and performs wireless communication with the terminal device using the second access point, and
when the first processing device receives a start completion signal of the second access point from the second processing device, the first processing device turns off the first access point.

2. The wireless communication system according to claim 1, wherein
the terminal device performs wireless communication in conformance with a first communication standard,
the terminal device communicates with the first processing device including the first access point in conformance with the first communication standard,
the second processing device transmits a handover ready signal indicating that handover is possible in conformance with a second communication standard in response to a handover operation performed by a user, and
when the first processing device receives the handover ready signal, the first processing device transmits the first connection information to the second processing device in conformance with the second communication standard.

3. A wireless communication system comprising:
a first processing device configured to include a first access point;
a terminal device configured to be wirelessly connected to the first access point; and
a second processing device, wherein
the first processing device transmits first connection information used for a connection to the first access point to the second processing device,
the second processing device starts a second access point using second connection information identical to the first connection information received from the first processing device and performs wireless communication with the terminal device using the second access point,
the terminal device performs wireless communication in conformance with a first communication standard,
the terminal device communicates with the first processing device including the first access point in conformance with the first communication standard,
the second processing device transmits a handover ready signal indicating that handover is possible in conformance with a second communication standard in response to a handover operation performed by a user,
when the first processing device receives the handover ready signal, the first processing device transmits the first connection information to the second processing device in conformance with the second communication standard,
when an error occurs during processing of a job received from the terminal device, the first processing device transmits an error occurrence signal to the terminal device,
when the terminal device receives the error occurrence signal, the terminal device displays a handover icon on a touch panel display included in the terminal device,
when the terminal device detects an operation performed on the handover icon by the user, the terminal device displays a message prompting execution of the handover operation to the second processing device, and
when the user performs the handover operation to the second processing device, the second processing device transmits the handover ready signal.

4. The wireless communication system according to claim 1, wherein
when the terminal device detects that the first access point has been turned off, the terminal device performs reconnection using connection information identical to the first connection information.

5. The wireless communication system according to claim 3, wherein
after recovering from the error, the first processing device uses connection information different from the first connection information before an occurrence of the error to start the first access point in conformance with the first communication standard.

6. The wireless communication system according to claim 3, wherein
when the second processing device receives an error recovery signal from the first processing device indicating that the first processing device has recovered from the error, the second processing device returns the second connection information of the started second access point to connection information before handover and restarts the second access point, and
when the first processing device receives a connection information recovery signal indicating that the second connection information of the second access point has been returned to connection information before handover from the second processing device, the first processing device starts the first access point using the first connection information identical to that before handover.

7. The wireless communication system according to claim 3, wherein
the second processing device transmits processing power information of the second processing device to the first processing device,
the first processing device determines whether or not handover to the second processing device is possible based on the processing power information, and when handover is possible, the first processing device transmits the first connection information of the first processing device to the second processing device, whereas when handover is not possible, the first processing device transmits a message indicating that handover to the second processing device is not possible to the terminal device.

8. A second processing device comprising:
a processor to start a second access point using second connection information upon receiving first connection information used for a connection to a first access point from a first processing device including the first access point to perform wireless communication with a terminal device,
wherein
the second connection information is identical to the first connection information and the processor perform wireless communication with the terminal device by using the second access point, and
the processor sends a start completion signal to the first access point upon completion of starting the wireless communication with the terminal device, the start completion signal being configured to cause the first processing device to turn off the first access point.

* * * * *